United States Patent
Sookram et al.

(10) Patent No.: US 9,180,327 B2
(45) Date of Patent: Nov. 10, 2015

(54) COMPOSITIONS AND METHODS FOR REMEDIATION OF CHLORINATED POLYAROMATIC COMPOUNDS

(75) Inventors: Burt R. Sookram, Palm Harbor, FL (US); John W. Veenstra, Plano, TX (US)

(73) Assignee: NBIP, LLC, Plano, TX (US)

( * ) Notice: Subject to any disclaimer, the term of this patent is extended or adjusted under 35 U.S.C. 154(b) by 81 days.

(21) Appl. No.: 14/239,155

(22) PCT Filed: Aug. 17, 2012

(86) PCT No.: PCT/US2012/051402
§ 371 (c)(1),
(2), (4) Date: Mar. 3, 2014

(87) PCT Pub. No.: WO2013/026014
PCT Pub. Date: Feb. 21, 2013

(65) Prior Publication Data
US 2014/0206921 A1    Jul. 24, 2014

Related U.S. Application Data

(60) Provisional application No. 61/524,561, filed on Aug. 17, 2011.

(51) Int. Cl.
*A62D 3/36* (2007.01)
*A62D 3/20* (2007.01)
*C02F 1/76* (2006.01)
*C02F 101/36* (2006.01)

(52) U.S. Cl.
CPC ... *A62D 3/20* (2013.01); *C02F 1/76* (2013.01); *C02F 2101/363* (2013.01)

(58) Field of Classification Search
CPC ........................................................ A62D 3/36
USPC .......................... 588/312, 318, 313, 406, 405
See application file for complete search history.

(56) References Cited

U.S. PATENT DOCUMENTS

| 5,057,207 A | 10/1991 | Basler |
| 6,616,815 B2 | 9/2003 | Kato et al. |
| 7,824,524 B2 | 11/2010 | Sakovich et al. |

OTHER PUBLICATIONS

International Search Report mailed Jan. 9, 2013; Authorized Officer: Lee W. Young.

*Primary Examiner* — Edward Johnson
(74) *Attorney, Agent, or Firm* — Winstead PC

(57) ABSTRACT

The present invention relates to compositions and methods that are effective in the remediation of contaminants found in natural sources such as groundwater, surface water, soil and manufactured products. The disclosed compositions and methods provide a method for remediating chlorinated polyaromatic compounds by treating them under pressure and heat with concentrated acids and chloride salts. After decomposition has occurred, the resulting acid that is produced is made dermal and non-corrosive. The compositions and methods claimed herein make the product safe to be in contact with humans and animal tissue without causing injury.

17 Claims, No Drawings

COMPOSITIONS AND METHODS FOR REMEDIATION OF CHLORINATED POLYAROMATIC COMPOUNDS

CROSS-REFERENCES TO RELATED APPLICATIONS

This Application claims the benefit under 35 U.S.C. §119 (e) of U.S. Provisional Patent Application Ser. No. 61/524,561 filed Aug. 17, 2011, which is incorporated herein by reference in its entirety as if fully set forth herein.

FIELD OF THE INVENTION

The present invention relates to compositions and methods that are effective in the remediation of contaminants found in natural sources such as groundwater, surface water, soil and manufactured products.

BACKGROUND OF THE INVENTION

PCBs are organic compounds composed of two benzene rings that are joined and containing at least 1 to 10 chlorine atoms. There can be 209 theoretically different combination of PCBs, of which 130 are found commercially.

PCBs are a group of chlorinated polyaromatic compounds including chlorinated polycyclic aromatic hydrocarbons that became widely used in numerous commercial applications starting in the early 1930s because of their unique thermal stability and non-reactive nature. It has recently been discovered that PCBs are also highly toxic. Because of this toxicity, the manufacture and use of PCBs has been greatly curtailed and their use has generally been limited to closed systems. However, because of their thermal and chemical stability and non-reactive nature, PCBs exist in significant amounts in the environment and have found their way into all levels of the food chain. There is therefore a need for an efficient and economic method for removing PCBs and other polyaromatic compounds from the environment.

Some basic PCB properties are: 1) it is odorless, tasteless, clear to pale yellow viscous liquid but when the chlorination is higher, the viscosity increases and the color becomes deeper yellow; 2) in water, it has a very low solubility, which increases with organic solvents and fats. The flash point temperature is between 170 to 380° C.; 3) it is resistant to oxidation, reduction, addition, elimination and electronic substitution reactions; 4) as the percentage of chlorine increases, the melting point and lipophilicity, which is the ability to dissolve in fats, also increases but at the same time its water solubility rate decreases; 5) PCBs can very easily penetrate skin, PVC and latex but is impermeable to butyl rubber, nitrile rubber, neoprene, and polyvinyl acetate; 6) it is very stable and does not decompose very easily and; 7) chemical, thermal and biochemical reactions are difficult because it generates very toxic products such as dibenzoidoxin and dibenzofurans with oxidation.

PCBs have been used in several applications such as: Coolants in insulation fluids for transformers, in fluorescent and electrical transformers, paints, cements, pesticides, protective covers in electrical wiring, caulking sealants, adhesives, waterproofing compounds, flame retardant products, several heavy industrial oils, electric fluids in transformers, capacitors, de-dusting agents, cutting oils, heat transfer fluids, hydraulic lubricants, asphalt roofing materials, carbonless copy paper, surgical implants, compressor oil, dielectric fluid, dyes, electromagnets, grout, inks, mixed with asbestos, natural gas pipelines, pesticides, plasticizers, rubberizes, space heaters, submersible well pumps, tar paper and wax extenders. PCBs have also been known to be by products of cigarette smoke.

PCBs can stay in the body for long periods after being absorbed by the fat cells, and also can be transmitted to the newborns through breast feeding. The ill effects of PCBs have been observed in liver damage, dental decay, rashes, irregular menstrual cycles, still-born fetuses, unusual skin sores and cancer.

Exposure to PCBs can also cause cancer, heart disease, reproductive problems, reduced sperm count, birth defects, immune suppression and endocrine disruption. For pregnant women, there is a special risk of defects in unborn and newborn child. These defects can include but are not limited to, lower birth rates, smaller head circumference, premature birth, depressed responsiveness, impaired visual recognition, poor short term memory, weight gain deficits, reduced IQ and/or difficulty paying attention.

Reports on the occurrence of PCBs in fish, mussels, seals, sea birds and birds of prey first appeared in 1966. In 1967, PCBs were detected in human adipose tissue, albeit in low concentrations. In 1968, PCBs from a leaking cooling system contaminated a rice oil tank at a food factory in Japan. As a result of the consumption of the contaminated rice oil, 1,000 people fell ill with a disease subsequently known worldwide as Yusho Disease.

Some of the methods by which PCBs can be decomposed include: 1) Incineration at a temperature of 1200° C. with excess oxygen and fuel; 2) Ultrasound where water undergoes thermolysis oxidation of the PCBs reducing it to Carbon Dioxide, Carbon Monoxide and hydrocarbons ($CH^+$) and releasing the Chlorine ($Cl^-$); 3) Irradiation wherein the PCBs are mixed with mineral oil or isopropyl alcohol with potassium hydroxide and then bombarded with gamma rays, releasing the Chlorine from the biphenyl; 4) Pyrolysis which uses a plasma arc process to achieve the 1200° C. but with an inert environment; 5) Use of microbes to attack the Carbon element in the PCBs; 6) Use of Enzymes as a catalyst to speed up the decomposition of the PCBs and 7) Chemical substitution to replace the Chlorine with polyethylene glycol, which must be done under nitrogen to accommodate the proper reaction which yields an insoluble aryl polyglycol that is filtered out. However, these methods are expensive and difficult to perform on a large scale.

Conventionally, PCBs were disposed of solely by incineration. However, this method is very likely to produce harmful materials (e.g., dioxins) such as by-products and, therefore, incineration disposal is not employed at present. Thus, there is a need to develop a process for decomposing PCBs that is not expensive and does not produce any harmful byproducts. In an attempt to find a process that produces no harmful materials (e.g., dioxins), there has recently been proposed a process wherein PCBs are oxidatively decomposed in supercritical water having a temperature of 374° C. or above and containing an oxidizing agent. However, since PCBs are chemically stable, it would be preferable to decompose PCBs at a temperature of 600° C. or higher.

SUMMARY OF THE INVENTION

The disclosed compositions and methods provide a method for remediating polychlorinated biphenyls by treating them under pressure and heat. After decomposition has occurred, the resulting composition that is produced is made dermal and non-corrosive. The compositions and methods claimed herein make the product safe to be in contact with humans and animal tissue without causing injury.

An embodiment of the invention is directed to a composition that is effective in the remediation of chlorinated polyaromatic compounds, said composition comprising a mixture of hydrochloric acid, chloride salt and water, wherein said mixture has a pH of less than 2.0 at a concentration of 0.1% by weight and a proton count ranging from $2.0 \times 10^{24}$ to $4.5 \times 10^{24}$ at a concentration of 1% by weight.

A further embodiment of the invention is directed to a method for the remediation of chlorinated polyaromatic compounds comprising the steps of mixing concentrated hydrochloric acid with water to cause an exothermic reaction; mixing an amount of a composition comprising at least one chlorinated polyaromatic compound with the mixture of hydrochloric acid and water; subjecting the chlorinated polyaromatic compound and acid mixture to increased pressure, and increasing the temperature of the mixture to at least 600° C.; maintaining the temperature of the mixture at or above 600° C. for at least 120 seconds; and adding a chloride salt to the chlorinated polyaromatic compound and acid mixture.

DESCRIPTION OF EXEMPLARY EMBODIMENTS

In this instant specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated step or group of steps but not the exclusion of any other step or group of steps.

It must be noted that, as used in the specification and the appended claims, the singular forms "a," "an" and "the" include plural references unless the context clearly dictates otherwise.

"Optional" or "optionally" means that the subsequently described event or circumstance may or may not occur, and that the description includes instances where the event or circumstance occurs and instances where it does not.

Ranges may be expressed herein as from "about" one particular value, and/or to "about" another particular value. When such a range is expressed, another aspect includes from the one particular value and/or to the other particular value. Similarly, when values are expressed as approximations by use of the antecedent "about," it will be understood that the particular value forms another aspect. It will be further understood that the endpoints of each of the ranges are significant both in relation to the other endpoint and independently of the other endpoint.

A weight percent of a component, unless specifically stated to the contrary, is based on the total weight of the formulation or composition in which the component is included.

"Dermal" is used herein to represent when a product is in contact with living tissue there is no physical or chemical changes that occur to the tissue. There is a lack of burning sensation or damage to such tissue.

The Globally Harmonized System of Classification and Labeling of Chemicals (GHS) defines skin irritation as "the production of reversible damage to the skin following the application of a test substance for up to 4 hours" and defines skin corrosion as "the production of irreversible damage to the skin; namely, visible necrosis through the epidermis and into the dermis, following the application of a test substance for up to 4 hours."

An embodiment of the invention is directed to a composition that is effective in the remediation of chlorinated polyaromatic compounds, said composition comprising a mixture of hydrochloric acid, ammonium chloride and water.

In a further embodiment of the invention, the chlorinated polyaromatic compound that is effectively remediated is a polychlorinated biphenyl or PCB.

An embodiment of the invention is directed to a highly protonated composition that is effective in the remediation of chlorinated polyaromatic compounds, said composition having a low pH and non-corrosive properties, and having a proton count between $2.0 \times 10^{24}$ to $4.5 \times 10^{24}$, when present at a concentration of 1% by weight and a pH of less than 2 when present at a concentration of 0.1% by weight.

In certain embodiments of the invention, the pH of the composition of the invention ranges from 1.55 to 1.65, when present at a concentration of 0.1% by weight.

In other embodiments of the invention, a solution comprising 0.1% by weight of the mixture of hydrochloric acid, ammonium chloride and water is used to remediate chlorinated polyaromatic compounds that are present in a solution or a surface. In additional embodiments of the invention, the solution comprising 0.1% by weight of the mixture of hydrochloric acid, ammonium chloride and water has a pH of less than 2.0. A composition comprising 1% by weight of the mixture of hydrochloric acid, ammonium chloride and water has a proton count ranging from $2.0 \times 10^{24}$ to $4.5 \times 10^{24}$, and color properties that will vary by the color of the original contamination.

In an embodiment of the invention, a composition comprising 1% by weight of the mixture of hydrochloric acid, ammonium chloride and water has a proton count ranging from $3.0 \times 10^{24}$ to $3.9 \times 10^{24}$. In other embodiments of the invention, the composition comprising 1% by weight of the mixture of hydrochloric acid, ammonium chloride and water has a proton count of at least $3.15 \times 10^{24}$.

An embodiment of the invention is directed to a method for the remediation of chlorinated polyaromatic compounds comprising the steps of mixing concentrated hydrochloric acid with water to cause an exothermic reaction, mixing an amount of a composition comprising at least one chlorinated polyaromatic compound to the mixture of hydrochloric acid and water, subjecting the chlorinated polyaromatic compound and acid mixture to increased pressure, thereby increasing the temperature of the mixture to at least 600° C., maintaining the temperature of the mixture at or above 600° C. for at least 120 seconds and adding a chloride salt to the chlorinated polyaromatic compound and acid mixture.

In certain embodiments of the invention, the initial mixture of hydrochloric acid and water is maintained at a temperature of at least 60° C. In an embodiment of the invention, the temperature of the initial mixture of hydrochloric acid and water ranges from 60° C. to 65° C.

In certain embodiments of the invention, the chlorinated polyaromatic compound and acid mixture is maintained at a temperature of at least 600° C. for at least 60 seconds. In other embodiments of the invention, the chlorinated polyaromatic compound and acid mixture is maintained at a temperature of at least 600° C. for at least 120 seconds. In other embodiments of the invention, the chlorinated polyaromatic compound and acid mixture is maintained at a temperature of at least 650° C. for 60 seconds to 120 seconds.

According to an embodiment of the invention, the temperature of the chlorinated polyaromatic compound and acid mixture is increased from a starting temperature of at least 60° C. to at least 600° C. In certain embodiments of the invention, the temperature is increased by subjecting the chlorinated polyaromatic compound and acid mixture to increased pressure. In certain embodiments of the invention, the pressure of the chlorinated polyaromatic compound and acid mixture is increased from atmospheric pressure to at least 1013 kPA. In other embodiments of the invention, the pressure of the chlorinated polyaromatic compound and acid mixture is increased from atmospheric pressure to at least 1057 kPA.

In certain embodiments of the invention the pressure is increased from atmospheric pressure to between 980 kPA to 1150 kPA.

In accordance with certain embodiments of the invention, the chloride salt is added to the chlorinated polyaromatic compound and acid mixture at a concentration of 5% to 30% by weight of the hydrochloric acid that is initially used.

In certain embodiments of the invention, the chloride salt is selected from ammonium chloride, sodium chloride, potassium chloride, calcium chloride, magnesium chloride, aluminum chloride, zinc chloride, nickel chloride, lead chloride, ferrous chloride, ferric chloride, gold chloride and combinations or mixtures thereof.

In accordance with certain embodiments of the invention, the composition comprising at least one chlorinated polyaromatic compound is added to the mixture of hydrochloric acid and water at a concentration of 35 parts to 150 parts of the composition to 1 part of hydrochloric acid and water. In other embodiments of the invention the ratio of chlorinated polyaromatic compound to acid ranges from 50-125:1 to 75-100:1.

WORKING EXAMPLES

Example 1

A 2 gallon glass-lined pressure reactor is used, to which is added 40 grams of a 50% concentrated hydrochloric acid followed by 10 grams of distilled water. The reaction is exothermic. The temperature recorded for a single experiment was 60° C.

5,000 grams of PCBs was added and the temperature was recorded. The pressure was gradually raised from 101.32 kPA (normal atmospheric pressure), which resulted in an increase in the temperature of the mixture. The pressure was increased to 1013 kPA or until a temperature of 600° C. was reached. Once this was achieved, it was held steady for 120 seconds and the pressure was released. A previously dissolved mixture of ammonium chloride and water (6.76 grams and 3.24 grams respectively) was then added to the container. The resulting composition had a pH of 1.7 and a proton count of $3.6 \times 10^{24}$.

Example 2

In the same system as above, 60 grams of a 50% hydrochloric acid and 10 grams of distilled water was added in the same procedure as above. Next, 5,000 grams of PCB was metered into the glass lined reactor. The pressure was increased to 1057 kPA or until the temperature reached 650° C., the pressure was maintained to insure a temperature of above 650° C. for 120 seconds. The pressure was then released and ammonium chloride/water mixture (10.14 grams/4.86 grams) was then added to the above container. The resulting composition had a pH of 1.65 and a proton count of $3.25 \times 10^{24}$.

After each experimental, a crude dermal test was completed as set forth below. This consisted of adding a few drops of test liquid on to a paper towel or lens paper and observing for physical change on the paper.

The results of the dermal test showed that the product resulting from the addition of the ammonium chloride/water mixture was not corrosive, i.e., the product was dermal-friendly.

Determination of Dermal Nature of a Product

Measurement of the dermal nature of a product is done by performing an absorption application of any acid-salt or base-salt mixture product using a Pyrex glass stirring rod of at least 250 mm to apply on a cellulose based material.

A glass stirring rod is inserted into the product to be tested. Using glass rod, stir the sample to be tested. The glass rod is rolled on lens cleaning paper. The lens cleaning paper is observed to determine if there is any corrosion or burning of the paper. Burning or corrosion of the paper indicates that the product is not dermal. On the other hand, when there is no noticeable damage to the test lens paper, the result indicates that the product is dermal-friendly.

It should be understood that the preceding is merely a description of one or more embodiments of this invention and that numerous changes to the disclosed embodiments can be made in accordance with the disclosure herein without departing from the spirit and scope of the invention. The preceding description, therefore, is not meant to limit the scope of the invention.

What is claimed is:

1. A composition that is effective in the remediation of chlorinated polyaromatic compounds, said composition comprising a mixture of hydrochloric acid, chloride salt and water, wherein said composition has a pH of less than 2.0 when the mixture is present at a concentration of 0.1% by weight and a proton count ranging from $2.0 \times 10^{24}$ to $4.5 \times 10^{24}$ when the mixture is present at a concentration of 1% by weight.

2. The composition of claim 1, wherein the chlorinated polyaromatic compound is a polychlorinated biphenyl.

3. The composition of claim 1, wherein the chloride salt is selected from ammonium chloride, sodium chloride, potassium chloride, calcium chloride, magnesium chloride, aluminum chloride, zinc chloride, nickel chloride, lead chloride, ferrous chloride, ferric chloride, gold chloride and combinations or mixtures thereof.

4. A method for the remediation of chlorinated polyaromatic compounds comprising the steps of:
    a) mixing concentrated hydrochloric acid with water to cause an exothermic reaction;
    b) mixing an amount of a composition comprising at least one chlorinated polyaromatic compound to the mixture of hydrochloric acid and water in step a);
    c) subjecting the chlorinated polyaromatic compound and acid mixture of step b) to increased pressure, thereby increasing the temperature of the mixture to at least 600° C.;
    d) maintaining the temperature of the mixture of step c) at or above 600° C. for at least 120 seconds; and
    e) adding a chloride salt to the chlorinated polyaromatic compound and acid mixture of step d).

5. The method of claim 4, wherein the initial mixture of hydrochloric acid and water is maintained at a temperature of at least 60° C.

6. The method of claim 4, wherein the temperature of the initial mixture of hydrochloric acid and water ranges from 60° C. to 65° C.

7. The method of claim 4, wherein the chlorinated polyaromatic compound and acid mixture is maintained at a temperature of at least 600° C. for at least 60 seconds.

8. The method of claim 4, wherein the chlorinated polyaromatic compound and acid mixture is maintained at a temperature of at least 600° C. for at least 120 seconds.

9. The method of claim 4, wherein the chlorinated polyaromatic compound and acid mixture is maintained at a temperature of at least 650° C. for 60 seconds to 120 seconds.

10. The method of claim 4, wherein the temperature of the chlorinated polyaromatic compound and acid mixture is increased from a starting temperature of at least 60° C. to at least 600° C.

11. The method of claim 10, wherein the temperature of the chlorinated polyaromatic compound and acid mixture is increased by subjecting the mixture to increased pressure.

12. The method of claim 11, wherein the pressure of the chlorinated polyaromatic compound and acid mixture is increased from atmospheric pressure to a pressure ranging from 980 kPA to 1150 kPA.

13. The method of claim 4, wherein the chloride salt is added to the chlorinated polyaromatic compound and acid mixture at a concentration of 5% to 30% by weight of the hydrochloric acid.

14. The method of claim 4 wherein, the chloride salt is selected from ammonium chloride, sodium chloride, potassium chloride, calcium chloride, magnesium chloride, aluminum chloride, zinc chloride, nickel chloride, lead chloride, ferrous chloride, ferric chloride, gold chloride and combinations or mixtures thereof.

15. The method of claim 4, wherein the composition comprising at least one chlorinated polyaromatic compound is added to the mixture of hydrochloric acid and water at a concentration of 35 parts to 150 parts of the composition to 1 part of hydrochloric acid and water.

16. The method of claim 15, wherein the ratio of chlorinated polyaromatic compound to acid ranges from 50-125:1.

17. The method of claim 15, wherein the ratio of chlorinated polyaromatic compound to acid ranges from 75-100:1.

\* \* \* \* \*